United States Patent [19]

Wright et al.

[11] Patent Number: 5,159,273

[45] Date of Patent: Oct. 27, 1992

[54] TRI-STATE BUS DRIVER TO SUPPORT RECONFIGURABLE FAULT TOLERANT LOGIC

[75] Inventors: Jeffrey P. Wright, Boise, Id.; Charles A. Finnila, Manhattan Beach, Calif.

[73] Assignee: Hughes Aircraft Company, Los Angeles, Calif.

[21] Appl. No.: 590,413

[22] Filed: Sep. 28, 1990

[51] Int. Cl.[5] ............................................. G01R 31/02
[52] U.S. Cl. .................................. 324/537; 371/22.1
[58] Field of Search ............... 324/500, 537, 555, 133, 324/158 R, 73.1; 371/11.1, 29.5, 67.1, 22.1, 22.5, 15.1, 6

[56] References Cited

U.S. PATENT DOCUMENTS 4,638,246  1/1987  Blank et al. .................. 371/22.1 X
4,841,232  6/1989  Graham et al. ................... 371/6 X Primary Examiner—Jack B. Harvey
Attorney, Agent, or Firm—Leonard A. Alkov; Wanda Denson-Low

[57] ABSTRACT

A three-state driver circuit including a first gating circuit responsive to a first enable signal for selectively gating an input signal to provide a first gated signal at an internal node, a second gating means responsive to a second enable signal and connected to the internal node for selectively gating the first gated signal so as to provide the output of the three-state bus driver, and a testing circuit for detecting or controlling the state of the internal node, and for providing a test output indicative of the inoperability of the first or second gating circuit.

3 Claims, 2 Drawing Sheets

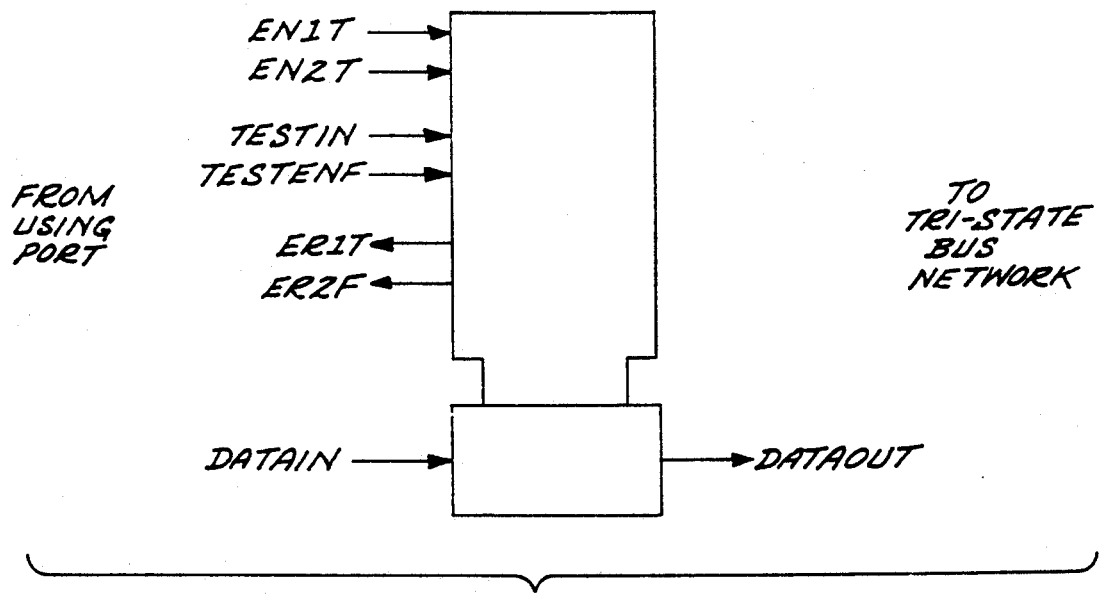
FIG. 2
FIG. 3
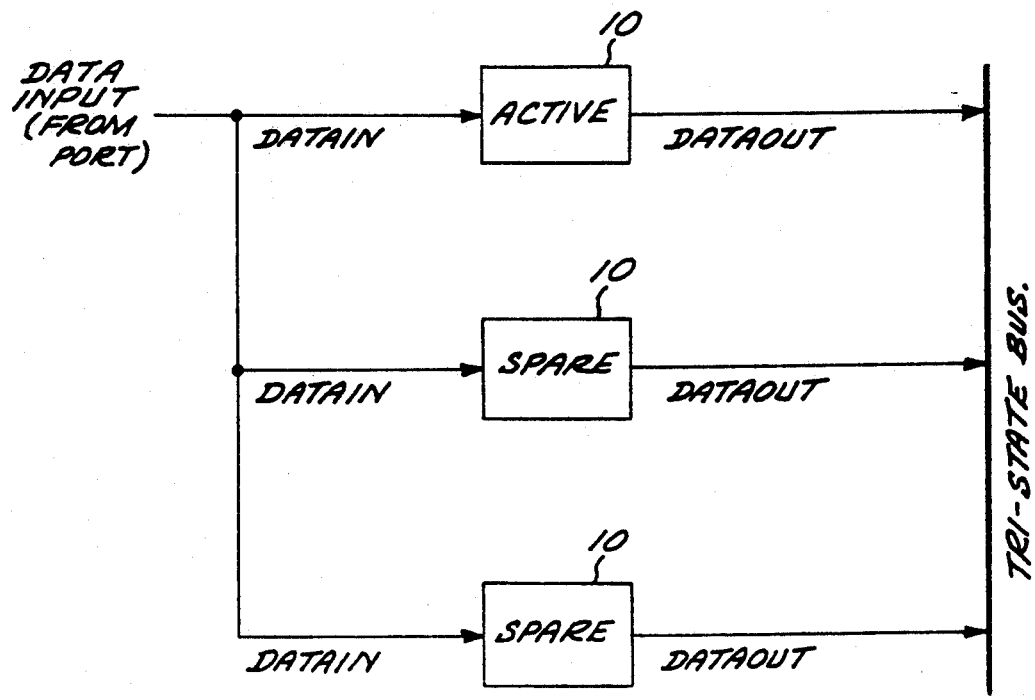

TRI-STATE BUS DRIVER TO SUPPORT RECONFIGURABLE FAULT TOLERANT LOGIC

BACKGROUND OF THE INVENTION

The disclosed invention relates generally to three-state bus drivers, and is directed more particularly to a testable, fault tolerant circuit macro three-state bus driver that is capable of being disabled and is suitable for reconfigurable very large scale integrated (VLSI) and wafer scale integrated circuit applications.

Three-state bus drivers are commonly utilized to couple a circuit, such as a computer peripheral device, to a bus that is shared by other circuits but not at the same time. For example, each input port to the bus from each circuit would be coupled to the bus via a three-state bus driver which would be appropriately controlled so that only one input port would be enabled relative to each line of the bus at any given time. All other three-state drivers connected to that bus line would be in the open circuit or high impedance state.

A consideration with the use of three-state drivers is that failure typically requires physical replacement in applications where discrete drivers are used, and can result in a non-usable bus or system in VLSI and wafer scale applications.

SUMMARY OF THE INVENTION

It would therefore be an advantage to provide a three-state bus driver circuit that is fault tolerant.

Another advantage would be to provide three-state bus driver circuit that can be redundantly implemented so as to provide for back-up circuitry that can maintain the functionality of a port having a faulty three-state driver.

The foregoing and other advantages are provided in a three-state driver circuit that includes a first gating circuit responsive to a first enable signal for selectively gating an input signal to provide a first gated signal at an internal node, a second gating means responsive to a second enable signal and connected to the internal node for selectively gating the first gated signal so as to provide the output of the three-state bus driver, and a testing circuit for detecting or controlling the state of the internal node, and for providing a test output indicative of the inoperability of the first or second gating circuit.

BRIEF DESCRIPTION OF THE DRAWING

The advantages and features of the disclosed invention will readily be appreciated by persons skilled in the art from the following detailed description when read in conjunction with the drawing wherein:

FIG. 2 is a diagram illustrating the input and output signals for the three-state bus driver of FIG. 1 in an integrated circuit implementation thereof.

FIG. 3 is a block diagram illustrating the use of a plurality of three-state bus drivers of FIG. 1 in a redundant configuration.

DETAILED DESCRIPTION OF THE DISCLOSURE

Figure 1:
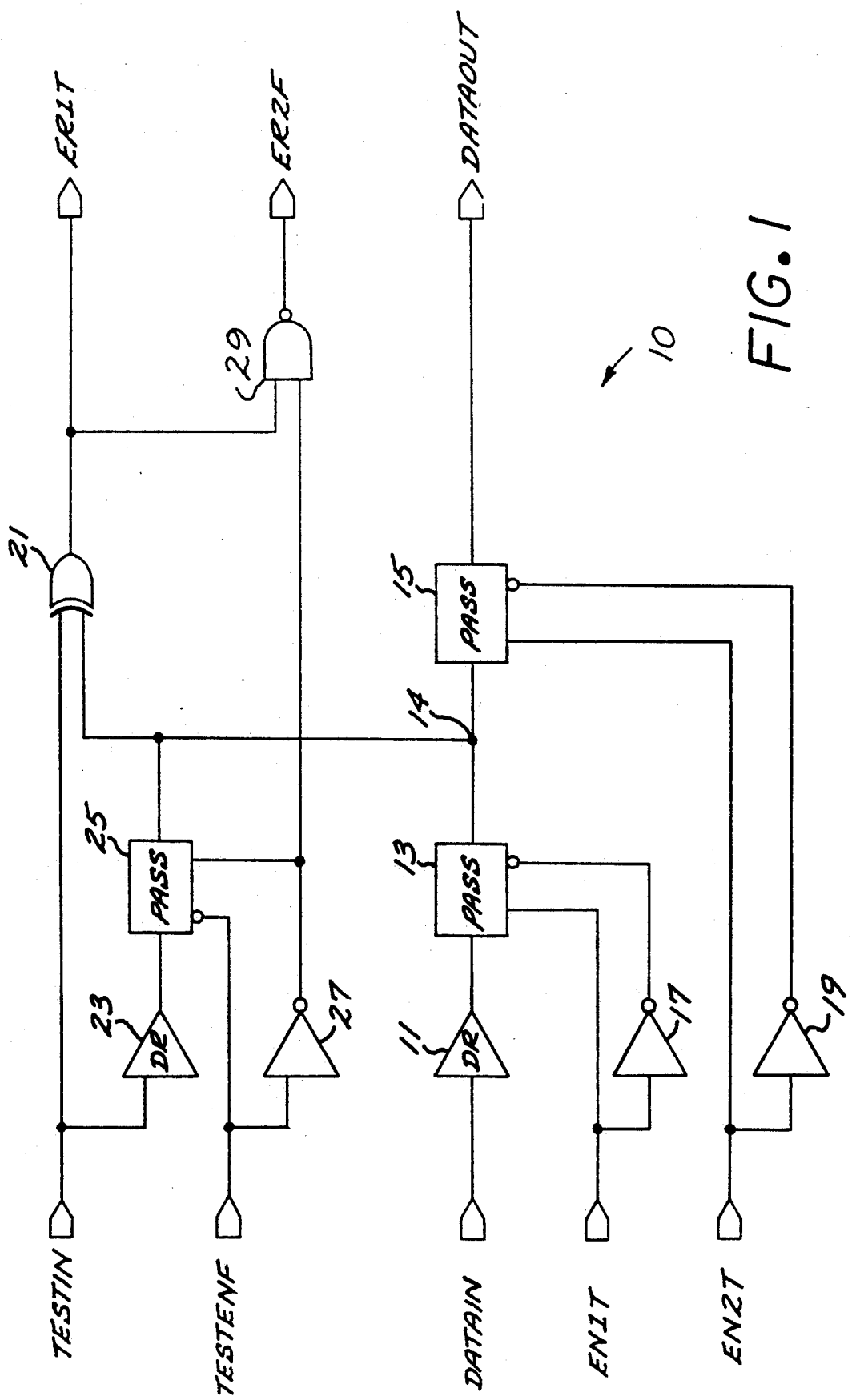
FIG. 1 is a schematic diagram of a three-state bus driver in accordance with the invention.

In the following detailed description and in the several figures of the drawing, like elements are identified with like reference numerals.

Referring now to FIG. 1, shown therein in accordance with the invention is a three-state bus driver 10 that includes a driver circuit 11 for receiving a data input signal DATAIN which is the functional input from the port associated with the three-state bus driver 10. The output of the driver 11 is provided at an internal node 14 through a pass gate 13 which in turn provides its output to a further pass gate 15. The output of the pass gate is the functional output DATAOUT of the bus driver 10. As discussed further herein, the internal node 14 is utilized for partially testing the operation of the bus driver.

By way of example, the driver circuit 11 comprises a standard driver circuit such as serially connected CMOS transistors coupled between a supply voltage $V_{dd}$ and ground. Also by way of example, the pass gates comprise respective standard pass gate circuits such as a parallel connected CMOS transistors that are connected in series with the input and output lines of the pass gate. Such a pass gate is controlled by complementary control inputs applied to the gates of the CMOS transistors, and is bidirectional.

One of the control inputs to the pass gate 13 is provided by an enable signal EN1T, while the other control input to the pass gate 13 is the complement of the enable signal EN1T as provided by an inverter 17. By way of particular example, the enable signal EN1T is active when high and the pass gate 13 is enabled pursuant to the active state.

One control input to the pass gate 15 is provided by an enable signal EN2T, while the other input thereto is the complement of the signal EN2T as provided by an inverter 19. Consistent with the control signals for the pass gate 13, the enable signal EN2T is active when high, and the pass gate is enabled pursuant to the active state.

The three-state bus driver 10 further includes test circuitry that accesses the internal node 14 between the pass gates 13, 15. An exclusive-OR gate 21 receives as one input a test signal TESTIN. The other input to the exclusive-OR gate 21 is connected to the output of pass gate 25 and the internal node 14. A driver 23 provides the test signal TESTIN to the pass gate 25.

One control input to the pass gate 25 is provided by a test enable signal TESTENF, while the other control input thereto is the complement of the test signal TESTENF as provided by an inverter 27. By way of illustrative example, the test enable signal TESTENF is active when low and the pass gate 25 is configured to be enabled in response to the active state of TESTENF. The output of the inverter 27 is further connected as one input to a NAND gate 29 which further receives an input from the output of the exclusive OR gate 21. A first error signal ER1T is provided at the output of the exclusive OR gate 21 while a second error signal ER2F is provided at the output of the NAND gate 29. The first error signal ER1T is continually present, while the second error signal ER2F is enabled by the test enable signal TESTENF.

It should be appreciated that when the second error signal ER2F gated for test active, it is the complement of the first error signal ER1T. It should further be appreciated that, depending upon implementation and application, one of the error signals may be sufficient.

It is contemplated that the three-state bus driver circuit can be implemented in integrated circuit form with only the foregoing input and output signals being accessible, as shown in FIG. 2. The following sets forth a summary of such input and output signals.

INPUTS:

DATAIN: Data Input is the data to be passed to the tri-state bus.

EN1T: Enable 1 (active high) is the first of two enables needed to pass data to the tri-state bus.

EN2T: Enable 2 (active high) is the second of two enables needed to pass data to the tri-state bus.

TESTIN: Test Input is toggled during test to determine correct functionality of the three-state bus driver.

TESTENF: Test Enable (active low) enables the test circuitry and Error 2 output (ER2F).

OUTPUTS

DATAOUT: Data Output is the output to the tri-state bus.

ER1T: Error 1 (active high) is the result of a continuous compare between TESTIN and the internal node 14.

ER2F: Error 2 (active low) is ER1T enabled by TESTENF.

In operation, the output signal DATAOUT is a replica of the input signal data signal DATAIN only when both enable signals EN1T, EN2T are active. If either (a) both EN1T and TESTENF are inactive or (b) only EN2T is inactive, the bus driver will be in the high impedance state. The mixed state with EN1T inactive but both EN2T and TESENF active should usually be avoided.

As for testing, the in system faults detected will to some degree be dependent upon the technology utilized to implement the bus driver. Usually the question to be determined is whether or not the bus driver is functional and should be used. Proper active drive can be checked by comparing DATAIN with DATAOUT with external logic during normal operation.

Proper inactive mode (i.e., high impedance mode) operation can be checked with special tests while the bus is not being used. Critical inactive mode faults would be shorts in the pass gates 13 or 15, which can be checked with the test circuitry of the bus driver connected to the internal node 14, in conjunction with certain input signals. Illustrative examples of tests that can be utilized for testing for shorts are set forth in Table I below. For these tests, both EN1T and EN2T are disabled, while TESTENF is enabled. TESTIN, DATAIN, and DATAOUT are utilized as inputs with the specified states, and shorts are indicated by 0's on ER2F. For such testing, the bidirectionality of the pass gate 15 is utilized.

The test driver 23 (which sources the internal node 14 via the pass gate 25) and the pass gate 25 are significantly smaller (less powerful) than the functional driver 11 and the pass gates 13 and 15. As a result, when TESTENF is active, the logic level of internal node 14 will be influenced almost entirely by the functional driver 11 if enabled onto that node; the test driver 23 will influence internal node 14 when both pass gates 11 and 15 are disabled.

The following table sets forth illustrative examples of tests for detecting shorts at the test node 14:

TABLE I

| Test Mode Setup | | | Test Inputs | | | Good Output |
|---|---|---|---|---|---|---|
| EN1T | EN2T | TESTENF | TESTIN | DATAIN | DATAOUT | ER2F |
| 0 | 0 | 0 | 0 | 1 | 1 | 1 |
| 0 | 0 | 0 | 1 | 0 | 0 | 1 |

The following table illustrates normal operating modes:

TABLE II

| Mode Setup | | | | Inputs | | Output | |
|---|---|---|---|---|---|---|---|
| EN1T | EN2T | TESTENF | Mode | TESTIN | DATAIN | DATAOUT | ER2F |
| 1 | 1 | 1 | Drive | V | X | V | 1 |
| 0 | 1 | 1 | Standby | X | X | Z | 1 |
| 1 | 0 | 1 | Standby | X | X | Z | 1 |
| 0 | 0 | 1 | Standby | X | X | Z | 1 |

V = Same Logic Variable
X = Don't Care
Z = High Impedance

In terms of implementation, it should be readily appreciated by persons skilled in the art that a three-state driver can be utilized in place of the driver 11 and the pass gate 13. Similarly, a three-state driver of appropriate less power can be utilized for the driver 23 and the pass gate 25.

In accordance with the invention, a plurality of three-state bus drivers 10 can be connected to each port coupled to a bus, as shown in FIG. 3. One of the bus drivers is activated while the others are deactivated as spares. In the event the active bus driver fails, it would be deactivated to isolate it from the bus, and one of the spares could be activated to replace the faulty bus driver.

In terms of system implementation, the bus driver can further be advantageously employed in a system that implements a procedure that detects bus driver failure and provides for deactivation of detected faulty bus drivers, for example an interrupt scheme. The procedure could further provide for a self-test routine to isolate and verify the failure. The results of the detection or self-test could be utilized to activate an available spare to replace a faulty one.

The foregoing has been a disclosure of a three-state bus driver that is reconfigurable for isolation from the bus to which it is connected, and further advantageously provides for fault detection. The bus driver of the invention can be advantageously utilized as a basic building block in integrated circuit bus systems to achieve fault tolerance and redundancy.

Although the foregoing has been a description and illustration of specific embodiments of the invention, various modifications and changes thereto can be made by persons skilled in the art without departing from the scope and spirit of the invention as defined by the following claims.

What is claimed is:

1. A three-state driver circuit comprising:

first gating means responsive to a first enable signal for selectively gating an input signal to an internal node;

second gating means responsive to a second enable signal for selectively gating the signal at said internal node to an output node of the three-state driver circuit; and selectively enabled testing means for detecting whether one of said first and second gating means is shorting wherein said testing means includes means for comparing the state of said internal node with a test signal and further wherein said testing means includes third gating means for sourcing said internal node when said first and second gating means are disabled.

2. The three-state driver of claim 1 wherein said second gating means is bidirectional and wherein the disabled states of said first and second gating means can be tested with said input signal, said test signal, and a further test signal applied to the output of said second gating means.

3. The three-state driver of claim 1 further including first driver means for providing said input signal to said first gating means, and wherein said testing means includes a second driver means for providing said test signal to said third gating means, said second driver means and said third gating means being less powerful than said first driver means and said first and second gating means such that said test signal will influence the state of said internal node only when both said first and second gating means are disabled.

* * * * *